United States Patent Office 2,828,289
Patented Mar. 25, 1958

2,828,289

POLYVINYL ACETAL ACID DICARBOXYLATES AND THEIR PREPARATION

John W. Mench, Rochester, N. Y., assignor to Eastman Kodak Company, Rochester, N. Y., a corporation of New Jersey No Drawing. Application March 9, 1955
Serial No. 493,289

9 Claims. (Cl. 260—73)

This invention relates to the preparation of polyvinyl acetal acid dicarboxylates in which polyvinyl alcohol is converted to polyvinyl acetal and this material is then esterified with a dicarboxylic acid anhydride.

At the present time there is considerable interest in water soluble compounds of a polymeric nature having better solubilities cold than hot, thus resembling gelatin. In the use of compounds of this type in coating operations the coating solution may be applied at ordinary temperatures and then by the use of heat, setting or increasing of the viscosity of the coating is obtained.

One object of my invention is to prepare compounds the salts of which are water soluble cold but at elevated temperatures the solubility thereof is decreased. Another object of my invention is to provide a process for making polyvinyl acetal dicarboxylates in which polyvinyl alcohol is converted to the acetal and then esterified without first isolating the material. Other objects of my invention will appear herein.

In its broadest aspects my invention comprises reacting upon polyvinyl alcohol or a hydrolyzed polyvinyl acetate with an aldehyde and a mineral acid catalyst to form polyvinyl acetal and converting the mass to esterification conditions to obtain a polyvinyl acetal dicarboxylate. My invention has for its purpose the preparation of end products as referred to herein with the elimination of two major disadvantages: (1) the necessity of isolation of the intermediate acetal and (2) the elimination of the pyridine catalyst in the esterification step.

I have found that the condensation of polyvinyl alcohol or hydrolyzed polyvinyl acetate with an aldehyde is advantageously carried out in the presence of acetic acid as the solvent using only an extremely small amount of a mineral acid such as hydrochloric or sulfuric acid as the catalyst. At elevated temperatures the acetalation reaction is extremely rapid, the extent thereof being governed by the amount of aldehyde employed. After the reaction is completed the mass may be converted, without cooling to esterification conditions by adding thereto an alkali metal acetate such as sodium, potassium or lithium acetate in sufficient quantity to neutralize the mineral acid catalyst therein and to supply a sufficient additional amount thereof to catalyze the esterification of the polyvinyl acetal with a dibasic acid anhydride such as phthalic anhydride. The extent of the esterification is controlled by the amounts of the catalyst and the dicarboxylic anhydride employed.

The preparation of the polyvinyl acetal is carried out by reacting upon polyvinyl alcohol or hydrolyzed polyvinyl acetate with an aldehyde. Ordinarily the compound known as polyvinyl alcohol retains less than 5% of polyvinyl acetate upon its preparation by hydrolyzing polyvinyl acetate. My invention may use as the starting material polyvinyl acetate which has been hydrolyzed to an extent of 50–100%. Any of the ordinary aldehydes may be employed to carry on the acetalation reaction. Some aldehydes which have been found to be particularly useful are acetaldehyde, paraldehyde isobutyraldehyde, normal butyraldehyde, benzaldehyde and the like. The polyvinyl alcohol or polyvinyl acetate is converted to the acetal form by reacting upon 1 part thereof with the aldehyde in the presence of .001–.05 part of mineral acid catalyst preferably with a diluent particularly a lower fatty acid such as acetic acid being present. This reaction occurred in a short time upon heating such as by means of a steam bath. After the acetal formation there was then added to the mass sodium acetate in an amount sufficient to completely neutralize the mineral acid catalyst plus an addition of more sodium acetate or other alkali metal acetate to constitute 5–500% of polyvinyl compound which is present, the amount used being that which will most satisfactorily promote the reaction of the dicarboxylic acid anhydride upon the polyvinyl acetal. Also added is dicarboxylic acid anhydride in an amount which will supply phthalyl or other dicarboxylic acid groups to essentially all of the hydroxyl groups of the polyvinyl acetal which is being reacted upon. The reaction is carried out at an elevated temperature such as of 150° F., the temperature employed being only limited by the boiling temperatures of the materials employed in the reaction mass. A temperature of 160–200° F. is very convenient for most reactions in accordance with my invention although my invention is not limited to that range. After the reaction has occurred the mass is preferably cooled and the product obtained may be conveniently separated from the mass by adding water thereto while continuing the mixing. This method of recovering dicarboxylic esters of polymeric materials is described and claimed in Hiatt and Emerson application Serial No. 294,274, filed June 18, 1952, now abandoned. Although my invention relates primarily to the preparation of the simple esters of the polyvinyl acetals, if desired, a small quantity (such as up to 5%) of acetic anhydride can also be incorporated in the reaction mass thus resulting in a polyvinyl acetal acetate dicarboxylate.

The following examples illustrate my invention:

*Example 1*

One part of commercial polyvinyl alcohol was mixed with 1.09 parts of isobutyraldehyde, 9.1 parts of acetic acid and 0.0036 part of concentrated hydrochloric acid for ½ hour at approximately 95° C. A clear dope was obtained. There was then added ½ part of anhydrous sodium acetate followed by the addition of 1.82 parts of tetrahydrophthalic anhydride. The stirring was continued for 3½ hours at about 95° C. The reaction mixture obtained was diluted with acetone and precipitated into esterified water. The material obtained was washed and dried with distilled water and the product was analyzed with the following results:

Percent polyvinyl tetrahydrophthalate _____ 25.2
Percent polyvinyl alcohol _____ 14.9
Percent polyvinyl isobutyral _____ 59.9

*Example 2*

One part of polyvinyl alcohol was mixed with 0.68 part of benzaldehyde, 9.1 parts of acetic acid and 0.0036 part of concentrated hydrochloric acid for 1¼ hours at about 95° C. A clear solution was obtained. There was added to this mass ½ part of anhydrous sodium acetate and 2.27 parts of succinic anhydride and the stirring was continued for 3½ hours at about 95° C. A gel resulted which upon dilution with acetone-water formed a clear solution. The product was isolated as described in the preceding example. Upon analyses the following results were obtained:

Percent polyvinyl succinate _____ 49.4
Percent polyvinyl alcohol _____ 18.2
Percent polyvinyl benzal _____ 32.4

Example 3

One part of polyvinyl alcohol was mixed with 1.09 parts of n-butyraldehyde, 0.0036 part of concentrated hydrochloric acid and 9.1 parts of acetic acid for 20 minutes at about 95° C. A clear dope was obtained. There was then added ½ part of anhydrous sodium acetate and 2.27 parts of diglycolic anhydride and the mixing was continued for 1 hour at about 95° C. The mass formed a gel which when diluted with acetone-water gave a clear solution. The product obtained was isolated as described in the preceding examples. Analyses of the product gave the following results:

Percent polyvinyl diglycolate_____ 20.6
Percent polyvinyl alcohol_____ 11.9
Percent polyvinyl butyral_____ 67.5

Example 4

One part of polyvinyl alcohol was mixed with 0.84 part of benzaldehyde, 9.1 parts of acetic acid and 0.0045 part of concentrated hydrochloric acid and the mass was stirred for 1 hour at 95° C. A clear solution was obtained. There was then added to the mass one part of anhydrous sodium acetate, 4.5 parts of acetic acid and 4.36 parts of 3-nitrophthalic anhydride. The stirring was continued for 3¼ hours at the same temperature and the product obtained was separated from the mass as described above. Analyses indicated that the product was made up as follows:

Percent polyvinyl 3-nitrophthalate_____ 55.2
Percent polyvinyl alcohol_____ 16.5
Percent polyvinyl benzal_____ 28.3

Example 5

Polyvinyl alcohol was reacted with aldehyde and then with phthalic anhydride in several batches, the proportions employed being indicated in the following table. In all cases the polyvinyl alcohol reacted sufficiently rapidly with the aldehyde that solution occurred within 10 minutes. The esterification step was of about 2-4 hours duration at steam bath temperatures. The product was isolated by precipitation into esterified water. All the samples were soluble in dilute aqueous alkali or ammonia although in the case of the low phthalyl products cooling was desirable:

| Parts of— | A | B | C | D | E | F |
|---|---|---|---|---|---|---|
| Polyvinyl Alcohol | 15 | 15 | 15 | 15 | 15 | 15 |
| Acetic acid | 150 | 150 | 150 | 150 | 150 | 150 |
| Conc. HCl, ml | 0.05 | 0.05 | 0.05 | 0.015 | 0.05 | 0.015 |
| Paraldehyde | 3 | 5 | 7.5 | 7.5 | 7.5 | 11.25 |
| Sodium acetate | 5 | 5 | 5 | 5 | 5 | 5 |
| Phthalic anhydride | 15 | 15 | 15 | 15 | 45 | 15 |
| Analysis: | | | | | | |
| Percent Phthalyl | 18.1 | 11.8 | 6.5 | 5.7 | 19.1 | 3.8 |
| Percent P. V. Alcohol | 23.7 | 15.6 | 14.1 | 16.4 | 4.1 | 9.3 |

The products which were obtained by the procedures described in the examples were in the acid form but could readily be converted to water soluble salts thereof by reacting with dilute aqueous solutions of alkalies, ammonia or aliphatic amines. The water-soluble compounds thus formed exhibit less solubility or higher viscosity in water at elevated temperatures than when cool or at room temperatures. These products are useful for coating purposes or as protective colloids. For instance, products of this type may be employed as the protective colloid for silver halides in photographic emulsions. In this use it may sometimes be desirable to employ mixtures of aldehydes in preparing the acetals in which some of the aldehyde employed may contain groups which are reactive for various purposes in the intended use. For instance, in photographic emulsion it might be desirable to employ some aldehydes having coupler groups such as those having an aromatic nucleus containing phenolic OH, alkoxy, aryloxy, amino, alkylamino, or arylamino and having a reactive position ortho or para to those groups or those having an active methylene group, so as to make polyvinyl acetal dicarboxylates in accordance with the process of our invention useful in color photography. The compounds in accordance with our invention may also be employed for removable layers in that they may be insoluble in acid solutions but upon treatment with alkaline solutions are readily removable from the surface upon which they have been applied such as backing layers or the like or for enteric purposes.

I claim:

1. A method of making polyvinyl acetal dicarboxylates which comprises reacting upon polyvinyl acetate, which has been 50–100% hydrolyzed, with an aldehyde in the presence of .001–.5 part of mineral acid catalyst per part of polyvinyl compound, adding to the mass without precipitating the product therefrom an alkali metal acetate in sufficient amount to neutralize the mineral acid and to provide an excess of the alkali metal acetate in an amount 5–500% of the polyvinyl compound present together with a dicarboxylic acid anhydride and reacting the mass until a substantial dicarboxyl content is imparted to the polyvinyl compound therein.

2. A method of preparing polyvinyl acetal dicarboxylates which comprises reacting polyvinyl alcohol with an aldehyde in the presence of .001–.05 part of mineral acid catalyst per part of polyvinyl alcohol, and without precipitating the product therefrom, adding sodium acetate to the mass in sufficient amount to neutralize the mineral acid catalyst and to provide 5–500% thereof based on the polyvinyl alcohol plus dicarboxylic acid anhydride and reacting the mass until a substantial dicarboxyl content is imparted to the polyvinyl compound.

3. A method of preparing polyvinyl acetal phthalates which comprises reacting polyvinyl acetate, 50–100% hydrolyzed, with an aldehyde and a mineral acid catalyst, and without precipitating the product therefrom, adding to the mass sufficient alkali metal acetate to neutralize the mineral acid catalyst and to provide 5–500% of alkali metal acetate based on the polyvinyl compound present plus phthalic anhydride and reacting upon the polyvinyl compound until a substantial phthalyl content is imparted thereto.

4. A method of preparing polyvinyl acetal phthalates which comprises reacting upon polyvinyl acetate, 50–100% hydrolyzed, with an aldehyde and a mineral acid catalyst, and without precipitating the product therefrom, adding to the mass sodium acetate in sufficient amount to neutralize the mineral acid catalyst and to constitute 5–500% based on the polyvinyl compound present plus phthalic anhydride and reacting the phthalic anhydride with the polyvinyl compound present until a substantial phthalyl content is imparted thereto.

5. A method of preparing polyvinyl acetal dicarboxylates which comprises reacting polyvinyl alcohol with paraldehyde and a mineral acid catalyst, and without precipitating the product therefrom, adding to the mass sodium acetate in sufficient amount to neutralize the mineral acid plus phthalic anhydride and reacting upon the polyvinyl compound present with the phthalic anhydride until a substantial phthalyl content is imparted thereto.

6. A method of preparing polyvinyl acetal dicarboxylates which comprises reacting upon polyvinyl alcohol with benzaldehyde and a mineral acid catalyst, and without precipitating the product therefrom, adding to the mass sodium acetate in sufficient amount to neutralize, the mineral acid and to provide 5–500% thereof based on the polyvinyl compound present plus nitrophthalic anhydride and reacting upon the polyvinyl compound present with the nitrophthalic anhydride to impart a substantial nitrophthalyl content to the polyvinyl compound.

7. A method of preparing polyvinyl acetal diglycolate which comprises reacting upon polyvinyl alcohol with butyraldehyde and a mineral acid catalyst, and without precipitating the product therefrom, adding to the mass an amount of sodium acetate in excess of that necessary to neutralize the mineral acid present plus diglycolic anhydride and reacting upon the polyvinyl compound with the diglycolic anhydride so as to impart a substantial diglycolyl content to the polyvinyl compound present.

8. A method of preparing a polyvinyl acetal succinate which comprises reacting polyvinyl alcohol with benzaldehyde and a mineral acid catalyst, and without precipitating the product therefrom, adding to the mass sodium acetate in excess of that necessary to neutralize the mineral acid present plus succinic anhydride and reacting upon the polyvinyl compound with the succinic anhydride for a sufficient time to impart a substantial succinyl content thereto.

9. A method of preparing a polyvinyl acetal tetrahydrophthalate which comprises reacting upon polyvinyl alcohol with isobutyraldehyde and a mineral acid catalyst, and without precipitating the product therefrom, adding to the mass sodium acetate in an amount in excess of that nececssary to neutralize the mineral acid plus tetrahydrophthalic anhydride and reacting upon the polyvinyl compound with the tetrahydrophthalic anhydride for a time sufficient to impart a substantial tetrahydrophthalyl content to the polyvinyl compound.

References Cited in the file of this patent

UNITED STATES PATENTS

| | | |
|---|---|---|
| 2,129,450 | Talbot | June 17, 1936 |
| 2,169,250 | Izard | May 27, 1937 |
| 2,333,796 | Kenyon et al. | June 13, 1940 |
| 2,380,032 | Dorough | Mar. 24, 1942 |
| 2,413,275 | Wilson et al. | Aug. 27, 1943 |
| 2,484,415 | Malm et al. | Aug. 10, 1945 |

OTHER REFERENCES

Kainer: Polyvinylalkahole, published by Enke, Stuttgart, Germany (1949), pages 56–61. (Copy in Scientific Library.)